United States Patent
Maichen

[15] 3,659,469
[45] May 2, 1972

[54] INFINITELY VARIABLE FRICTION GEARING

[72] Inventor: Karl Maichen, 12, Thalackerstrasse, Lauterach, Austria

[22] Filed: Nov. 30, 1970

[21] Appl. No.: 93,707

[30] Foreign Application Priority Data

Apr. 1, 1970 Austria.....................................A 2988
Nov. 5, 1970 Austria.....................................A 9961

[52] U.S. Cl.............................................................74/192
[51] Int. Cl......................................................F16h 15/16
[58] Field of Search....................................................74/192

[56] References Cited

FOREIGN PATENTS OR APPLICATIONS 1,021,226  12/1957  Germany.................................74/192

*Primary Examiner*—Leonard H. Gerin
*Attorney*—Imirie & Smiley

[57] ABSTRACT

An input shaft and an output shaft carry each at least one bevel wheel. At least one of said bevel wheels is axially adjustable. A power-transmitting ring is disposed between the two bevel wheels and is in frictional contact on one side with the input-side bevel wheel and on the other side with the output-side bevel wheel.

7 Claims, 3 Drawing Figures

INVENTOR
KARL MAICHEN

BY *Toriisse & Smiley*

ATTORNEYS

INFINITELY VARIABLE FRICTION GEARING

SUMMARY OF THE INVENTION

An infinitely variable friction bearing comprises an input shaft and an output shaft, each of which carries at least one bevel wheel, and a power-transmitting ring, which is disposed between the rolling contact surfaces of said bevel wheels, which rolling contact surfaces define a gap, which is disposed in the plane defined by the axes of the bevel wheels and which tapers toward one end.

The invention relates to a friction gearing which comprises two or more opposite bevel wheels having an obtuse included angle and overlapping rolling contact surfaces having parallel axes. At least one bevel wheel is an input-side bevel wheel and at least one bevel wheel is an output-side bevel wheel. The bevel wheels are coupled by a rolling contact ring, which is enclosed between the bevel wheels.

According to an essential feature of the invention, the rolling contact surfaces of the bevel wheels define a gap, which is disposed in the common plane defined by the axes of the bevel wheels and tapers toward one end.

According to another feature of the invention, the gearing comprises means for automatically restoring the friction ring.

According to a further feature of the invention, a pair of output-side bevel wheels are provided and a pair of input-side bevel wheels, which extend between the output-side bevel wheels, and the angle included by the output-side bevel wheels is equal to the sum of the angles included by the forward and rear sides of both input-side bevel wheels.

To ensure a symmetrical loading mainly of the input-side bevel wheels so that there will no tilting moment at the bearings, it is suitable in accordance with another feature of the invention to provide input-side bevel wheels in the form of double cones having a forward rolling contact surface which is substantially mirror-symmetrical to the rear rolling contact surface.

Further details of the invention will be explained more fully with reference to the drawing, in which two embodiments of the friction gearing according to the invention are shown by way of example.

Figure 1:
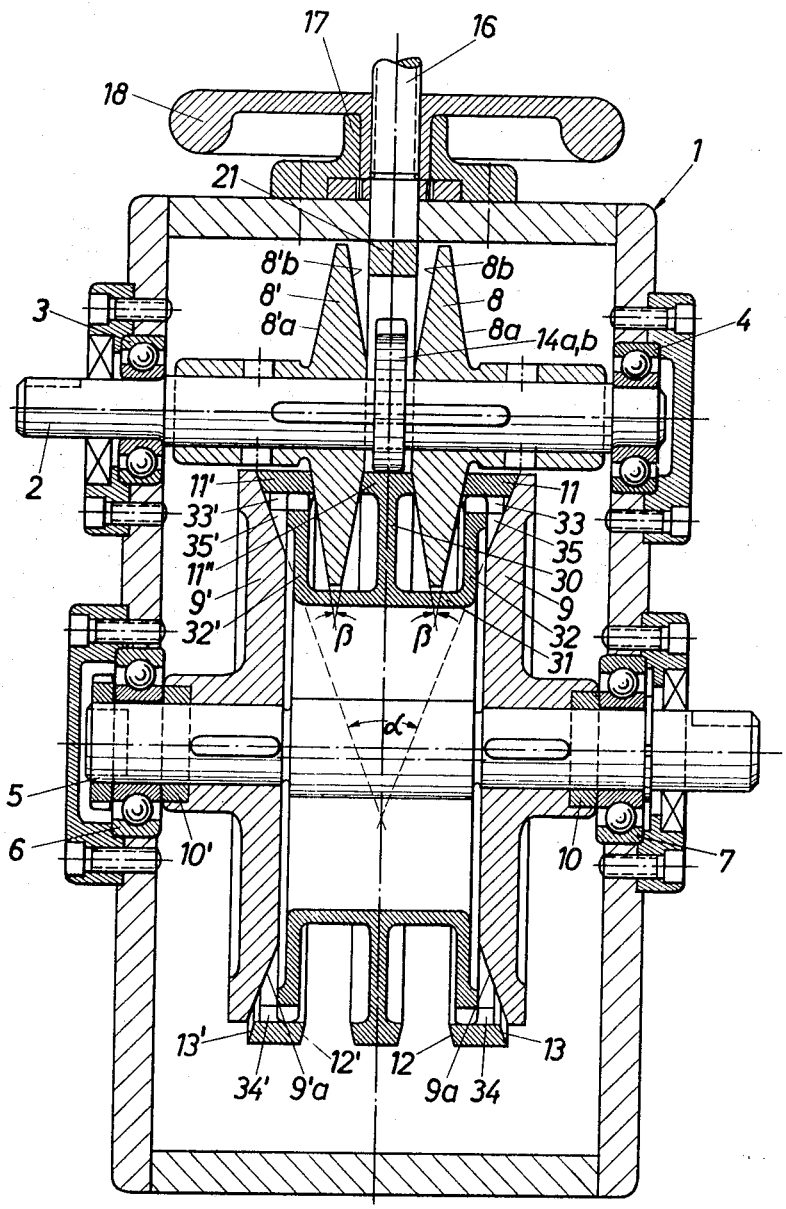
FIGS. 1 and 2 are axial sectional views showing respective embodiments of the gearing.

The friction gearing according to the invention comprises a housing 1, in which the input shaft 2 is mounted in bearings 3 and 4 and the output shaft 5 is mounted in bearings 6 and 7. The shafts 2, 5 have parallel, spaced apart axes. Each of the shafts 2, 5 is provided with two bevel wheels 8, 8' or 9, 9', which are non-rotatably mounted on the respective shaft. The bevel wheels 8, 8' consist of symmetrical double cones having mirror-symmetrical rolling contact surfaces 8a, 8b and 8a', 8b', respectively, and are axially displaceably mounted on the input shaft 2. The bevel wheels 8, 8' have a larger included angle than the bevel wheels 9, 9', which are also slightly axially adjustable on the output shaft 5 and bear on the outside against a resilient member 10 and 10', such as Bellevile springs, which force the bevel wheels 9, 9' against the bevel wheels 8, 8'. The bevel wheels overlap in part of their rolling contact surfaces. The height of said part is as large as or smaller than the radius of the rolling contact surfaces. The included angles of cones 8, 8' and 9, 9' are selected to meet the condition $\alpha = 2\beta$, where $\alpha$ is the angle included by the rolling contact surfaces 9a, 9a' of the two output wheels 9, 9' and $\beta$ is the angle included by the rolling contact surfaces 8a, 8b or 8a', 8b' of each of the input wheels 8 and 8'. In a preferred embodiment, an angle $\alpha$ of 24° and an angle $\beta$ of 12° have proved satisfactory.

Motion is transmitted from the input-side bevel wheels 8, 8' to the output-side bevel wheels 9, 9' by three rolling contact rings 11, 11', 11''. Each of the rolling contact rings 11, 11' is clamped between the rolling contact surface of an output-side bevel wheel 9 or 9' and the opposite rolling contact surface of an input-side bevel wheel 8 or 8'. The rolling contact ring 11'' is clamped between the opposite rolling contact surfaces of the input-side bevel wheels 8, 8'. The input shaft 5 extends through the rolling contact rings 11, 11', 11''.

The rolling contact rings 11, 11' and 11'' consist preferably of plastics material or another molded material.

Figure 3:
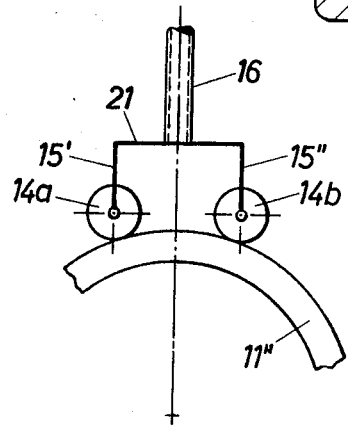
FIG. 3 is a diagrammatic side elevation showing the control mechanism for controlling the friction ring.

The rolling contact surfaces 12, 13 or 12', 13' of the friction rings have different angles of inclination to mate the rolling contact surfaces 8a, 9a or 8a', 9a', respectively. As is apparent from FIG. 3, two rollers 14a, 14b are provided for a radial adjustment of the rolling contact rings 11, 11' and 11''. These rollers are symmetrically arranged with respect to the apex of the rolling contact ring and disposed between the input-side bevel wheels 8, 8' and engage the same and are mounted in the prongs 15', 15'' of a fork 15, which straddles the input shaft 2. At the center of its cross-piece 21, the fork 15 carries a threaded bolt 16, which is threadedly adjustable in a nut 17 that is provided with a handwheel 18.

The inside of the ring 11'' is connected by a web 30 to a hub 31. Webs 32, 32' which are parallel to the web 30 extend from both ends of the hub 31 and are provided at their free edge with teeth 33 or 33', which mesh with internal teeth 34, 34' of the rings 11, 11', respectively. As a result, the rings 11, 11' and 11'' are coupled for joint rotation but are axially displaceable relative to each other.

The present embodiment of the gearing comprises four rolling contact surfaces on the input side and two rolling contact surfaces on the output side.

The gearing operates as follows: The driving shaft 2 drives the bevel wheels 8, 8' and these drive the bevel wheels 9, 9' by means of the rolling contact rings 11, 11' and 11''. When a change of the conversion of torque is desired, it will be sufficient to turn the handwheel 18 so that the rolling contact ring 11'' and consequently the rolling contact rings 11 and 11' are contacted with the friction cones 8, 8' and 9, 9' at a different diameter while the springs 10, 10' are compressed or relaxed. The hand wheel 18 merely acts to depress the rolling contact rings 11, 11' 11'' to a smaller diameter of the output-side cones 9, 9'. The return of the rolling contact rings is due to the fact that the input-side cones 8, 8' and the output-side cones 9, 9' define gaps 35 and 35', which are disposed in the plane defined by the axes of said cones and which taper toward the output shaft 5.

Figure 2:
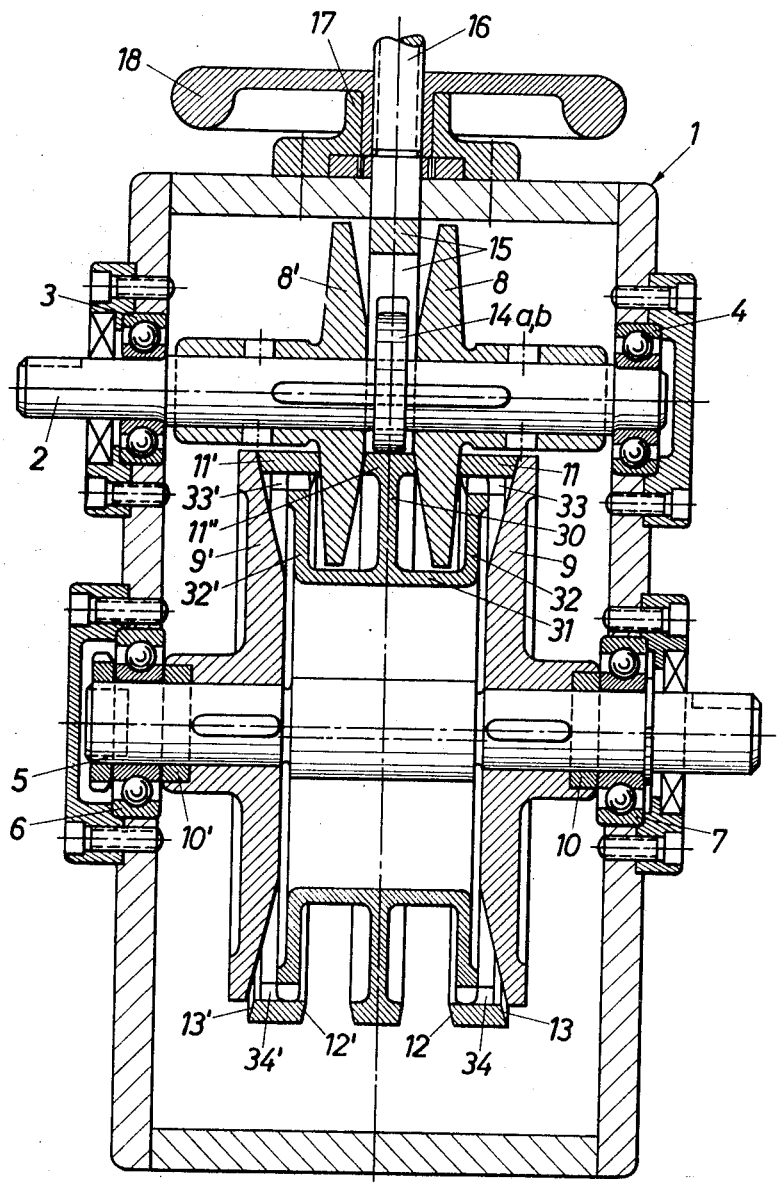

It will be understood that various changes in design are possible within the scope of the invention. For instance, as is shown in FIG. 2, the input cones 8, 8' may be asymmetrically shaped so that the obtuse angle included by the generatrices of each of the forward rolling contact surfaces 8b, 8b' of the cones 8 and 8' differs from the obtuse angle included by the generatrices of each of the rear rolling contact surfaces 8a and 8a' of the cones 8 and 8', respectively. In other respects, all parts of the embodiment of FIG. 2 are the same as in the embodiment of FIG. 1 and provided with the same reference numbers.

A plurality of the gear trains which are shown may be arranged one beside the other. In this case, a plurality of pairs of cones 9, 9' are arranged one beside the other on the output shaft 2 and two double cones mounted on a common input shaft extend between the cones of each of said pairs. In this arrangement, the mutually adjacent cones on the input shaft taper in opposite directions and are arranged back-to-back and may be replaced by a double cone.

What is claimed is:

1. An infinitely variable friction gearing comprising, in combination, an input shaft, an output shaft, which is parallel to and spaced from said input shaft, at least one bevel wheel non-rotatably mounted on said input shaft, at least one bevel wheel non-rotatably mounted on said output shaft, at least one of said bevel wheels being axially displaceable on its shaft, and a power-transmitting ring, which is disposed between said bevel wheels and in frictional contact on one side with the bevel wheel on the input shaft and on the opposite side with the bevel wheel of the output shaft, the bevel wheels having rolling contact surfaces which are in contact with said common ring and define a gap, which is disposed in the plane defined by the axes of the bevel wheels and tapers toward one end.

2. A gearing as set forth in claim 1, characterized in that a pair of output-side bevel wheels and a pair of input-side bevel wheels extending between the output-side bevel wheels are provided and the angle included by the output-side bevel wheels is equal to the sum of the angles included by the forward and rear sides of both input-side bevel wheels.

3. A gearing as set forth in claim 1, characterized in that at least three rolling contact rings are provided, which are coupled for joint rotation and one of which is disposed between and cooperates with two input-side bevel wheels whereas each of the two other rings is disposed between and cooperates with one of said input-side and one of said output-side bevel wheels and the rolling contact rings disposed between and cooperating with an input-side bevel wheel and an output-side bevel wheel are axially displaceable relative to the rolling contact ring disposed between and cooperating with the two input-side bevel wheels.

4. A gearing as set forth in claim 1, characterized in that the number of rolling contact surfaces of the input-side bevel wheels exceeds the number of rolling contact surfaces of the output-side bevel wheels.

5. A gearing as set forth in claim 1, characterized in that the mutually opposite generatrices of the rolling contact surfaces of the input-side and output-side bevel wheels converge toward the output shaft.

6. A gearing as set forth in claim 3, characterized in that a roller which engages at least one of the rolling contact rings is provided for adjusting the rolling contact rings and is provided with means for adjusting the roller in the radial direction of the rolling contact rings.

7. A gearing as set forth in claim 1, characterized in that the input-side bevel wheels consist of double cones having a forward rolling contact surface which is substantially mirror-symmetrical to the rear rolling contact surface.

* * * * *